United States Patent [19]

Sugaya et al.

[11] Patent Number: 4,903,255
[45] Date of Patent: Feb. 20, 1990

[54] OPTICAL RECORDING DISC

[75] Inventors: Syoji Sugaya, Nishinomiya; Toshihiro Rokujo, Hashima; Hisayoshi Asahino, Ampachi, all of Japan

[73] Assignee: Sanyo Electric Co., Ltd., Japan

[21] Appl. No.: 84,032

[22] Filed: Aug. 10, 1987

[30] Foreign Application Priority Data

Mar. 31, 1987 [JP] Japan ............................ 62-48241[U]

[51] Int. Cl.$^4$ .............................................. G11B 7/26
[52] U.S. Cl. .................................... 369/284; 283/81; 369/272; 369/286
[58] Field of Search ............... 369/274, 272, 283, 286, 369/284; 283/81, 904

[56] References Cited

U.S. PATENT DOCUMENTS

| | | | |
|---|---|---|---|
| 2,010,867 | 8/1935 | Kubo | 369/286 |
| 2,200,866 | 4/1940 | Thompson . | |
| 2,353,369 | 7/1944 | Sears | 369/273 |
| 3,245,691 | 4/1966 | Gorman | 369/283 |
| 3,642,284 | 2/1972 | Russell . | |
| 3,970,803 | 7/1976 | Kinzie et al. . | |
| 4,752,554 | 6/1988 | Sato et al. | 369/284 |

FOREIGN PATENT DOCUMENTS

| | | |
|---|---|---|
| 21705 | 1/1981 | European Pat. Off. . |
| 158906 | 10/1985 | European Pat. Off. . |
| 210692 | 2/1987 | European Pat. Off. . |
| 2227993 | 2/1973 | Fed. Rep. of Germany . |
| 515183 | 11/1939 | United Kingdom . |
| 811160 | 4/1959 | United Kingdom . |
| 833266 | 4/1960 | United Kingdom . |
| 899195 | 6/1962 | United Kingdom . |
| 2031602 | 4/1980 | United Kingdom .. |
| 1597843 | 9/1981 | United Kingdom . |

OTHER PUBLICATIONS

Movement of Electronic History—"Digital Audio Disc in Which Optical System is a Main Factor", Nikkei Electronics, 1981, 8.17, pp. 187–206.

Primary Examiner—Steven L. Stephan
Attorney, Agent, or Firm—Darby & Darby

[57] ABSTRACT

An optical recording disc, such as a compact disc, having a non-playback side including a write-in region available for adding a message or an illustration so that it can be provided with such one and only design as each individual consumer may desire and it is suitable for a gift.

20 Claims, 8 Drawing Sheets

OPTICAL RECORDING DISC

BACKGROUND OF THE INVENTION

1. Field of the Invention

This invention relates to an optical recording disc, whether of the compact disc type or not, from which audio and/or visual information recorded therein can be optically read out.

2. Description of the Prior Art

Recently, in the field of music recording mediums, compact discs known as such are gradually taking the place of conventional discs having groove in which audio to analog information is recorded. A compact disc is described in detail in "Housou Gijutsu (Broadcasting Technologies)", No. 3, 1981, pp. 316–317, and "Nikkei Electronics", Aug. 17, 1981. The compact disc has a bit string formed on a transparent circular substrate and which is recorded audio digital information, an aluminum film being deposited on the surface of the bit string from a surface of a side opposite to the aluminum film, and reflected light from the aluminum film is so utilized as to read out the recorded sound information. Since the compact disc has a high information recording density, it can record more than one hour long music on only one side. It is possible to record information on both sides of the compact disc considering from the relevant principle of recording as well as from the constructional design of any playback device for use with such disc. However, for certain commerical reasons and/or for the reason that double-side recording requires an excessively long period of time for playback, compact discs now available on the market are those having information recorded on one side only. The other side of such disc is used for same purpose as a label on an analog disc of the conventional type. That is, the name of manufactures of the disc, a brand name, title of music, name of performer, etc. are printed on one such side as is independent of the playback side.

As is the case with conventional analog discs, compact discs are often used for gift purposes. However, since a compact disc is small in size as compared with an analog disc, no card of any suitable size on which a relevant message is written or printed is available which is to accompany the compact disc as a gift.

Another problem is that, unlike a jacket for an analog disc, a case for a compact disc has no room for accommodating such card, the face of which often leads to the loss of a card accompanying the compact disc.

SUMMARY OF THE INVENTION

This invention has been made in view of these problems with the prior art, and accordingly it is a primary object of the invention to provide an optical recording disc, whether of the compact disc type or otherwise, which has on its one side irrelevant to the playback (readout) of the recorded information (which side is hereinafter referred to as the non-playback side) a write-in region available for adding a message, an illustration, or the like by writing means, thereby serving for the purpose of a message card, and which is thus suitable for use as a gift.

It is a second object of the invention to provide an optical recording disc which, through utilization of the write-in region, permits a unique design to be created to make the disc one and only thing.

It is a third object of the invention to provide an optical recording disc having on the non-playback side a write-in region available for adding information simultaneously with such information as name of a manufactures, etc. which is conventionally printed on the non-playback side.

It is a fourth object of the invention to provide an optical recording disc in which the non-playback side as a whole can be utilized as a write-in region and which permits change of any information written in the write-in region easily.

It is a fifth object of the invention to provide an optical recording disc which can prevent added note in the write-in region from being stained.

It is a sixth object of the invention to provide an optical recording disc which has a special region for adding to title in the form of lettering or a pictorial design to better clarify the subject and purpose of the added note or the like written-in region.

The above and further objects and features of the invention will more fully be apparent from the following detailed description with accompanying drawings.

DESCRIPTION OF THE PREFERRED EMBODIMENTS

Figure 1:
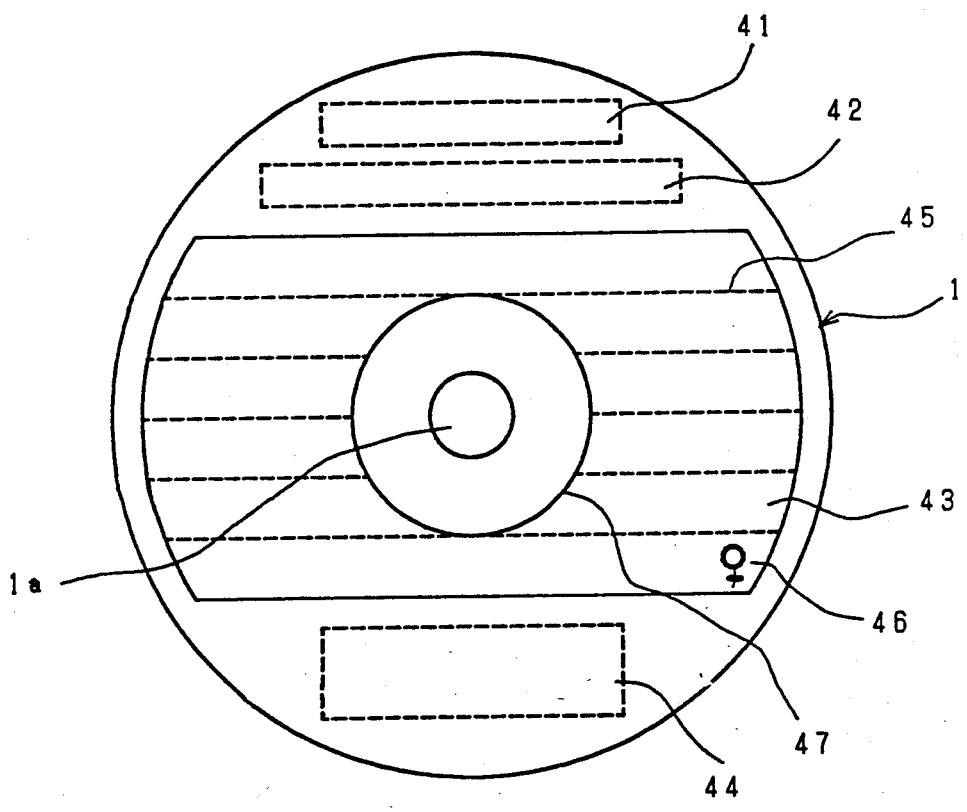
FIG. 1 is a plan view showingn the non-playback side of a compact disc representing a first embodiment of the invention.
Figure 2:
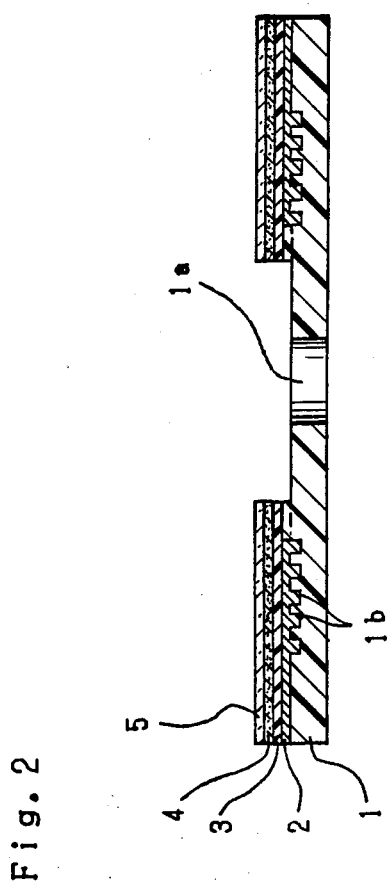
FIG. 2 is a sectional construction view thereof.

FIG. 1 is a plan view of the non-playback side of a compact disc embodying the invention, and FIG. 2 is sectional view showing the construction thereof.

A disc-shaped substrate 1 formed of a transparent synthetic resin material, such as polycarbonate or the like, has in the center thereof a hole 1a for insertion of a spindle of a compact disc player (not shown). On a surface of one side (upper side in FIG. 2) of the substrate 1, a bit string 1b which corresponds to audio information is formed by a stamper press, and a reflective film 2 is formed on the surface of the bit string 1b by aluminum deposition, the surface of the reflective film 1 being covered with a protective layer 3 which is formed, for example, of an ultraviolet curing type resin. An optical head of the compact disc player projects a light beam from a surface of the other side (bottom side in FIG. 2) of the substrate 1 and receives reflective light from the reflective film 2 disposed on the back side of the bit string 1b, the reflected light so received being converted into an electric signal.

A print layer 4 is provided on the surface of the protective layer 3 in the same manner as in any conventional compact disc. On the print layer 4 there is adhesively placed a clear seal 5 which covers at least a write-in region available for adding a message or the like and which has a hole bored therein which corresponds to the spindle hole 1a.

FIG. 1 illustrates, by way of example, a printing pattern of the print layer 4. A region 42, the second one from top, is a title region in which letters on words, such as "HAPPY BIRTHDAY", "MERRY CHRISTMAS", or "CONGRATULATION!", are printed which relate to the music recorded in the compact disc and/or the purpose for which the compact disc is used as a gift, or more specifically to a message or note to be written by the user in a write-in region 43, which will be hereinafter explained. The title region 42 may be previously written in by printing or may be written in by the comsumer as required. Such printing or writing in the title region 42 may be in the form of lettering, a picture, or otherwise.

The write-in region 43 for adding a message covers a large area around the spindle hole 1a and has a white or light color ink deposited over its entire area for convenience of writing words or the like therein by writing means, such as ball point pen, felt pen, pencil, or the like. The embodiment shown in FIG. 1 has ruled lines 45 printed thereon for ease of writing. The ruled lines 45 may be formed as lines void of ink. The write-in region 43 has a decorative design 46 printed at its end.

A region 41 provided above the title region 42 is for printing a brand name, and a region 44 provided below the message write-in region 43 is for printing music title and artist name.

In these regions 41, 44 and the title region 42, where not available for subsequent writing-in, the same ink may be used as or a different ink from the one used for the message write-in region 43. Where same ink is used, the number of printing stages involved can be minimized. It is noted, however, that a special type of ink used for the purpose of the write-in region is used which produces a roughened surface effect. This means that the surface is likely to catch dirt. Therefore, where a different ink is used for parts other than the write-in region, the appearance of the print on those parts can be maintained in good condition for long.

In FIG. 1, the write-in region 43 is configured according to the shape of the compact disc so that the shape of subtending shorter sides thereof is arcuate shape and a circular cutout in the center. However the configuration of the write-in region 43 is not limited to such pattern. For example, the write-in region 43 may include the area surrounding the spindle hole 1a and not covered by the reflective film 2 (or an area itnernal of a circle shown by 47 and other than the spindle hole 1a). It is also possible that the write-in region 43 covers the entire non-playback side.

The transparent seal 5 is not essential. Such seal, if not place in position at the time of manufacture or sale, may be attached so that it can be adhesively placed, if desired, after the user has written a message in the write-in region. In this case, it is possible to use an adhesive which makes the seal unreleasable once it is applied.

Where the transparent seal 5 has been previously applied in position, it is released before a message or illustration is written in the write-in region 43 by a suitable writing means, and after such writing the seal 5 is reinstated. Thus, one and only compact disc is completed.

Next, another embodiment will be explained.

Figure 3:
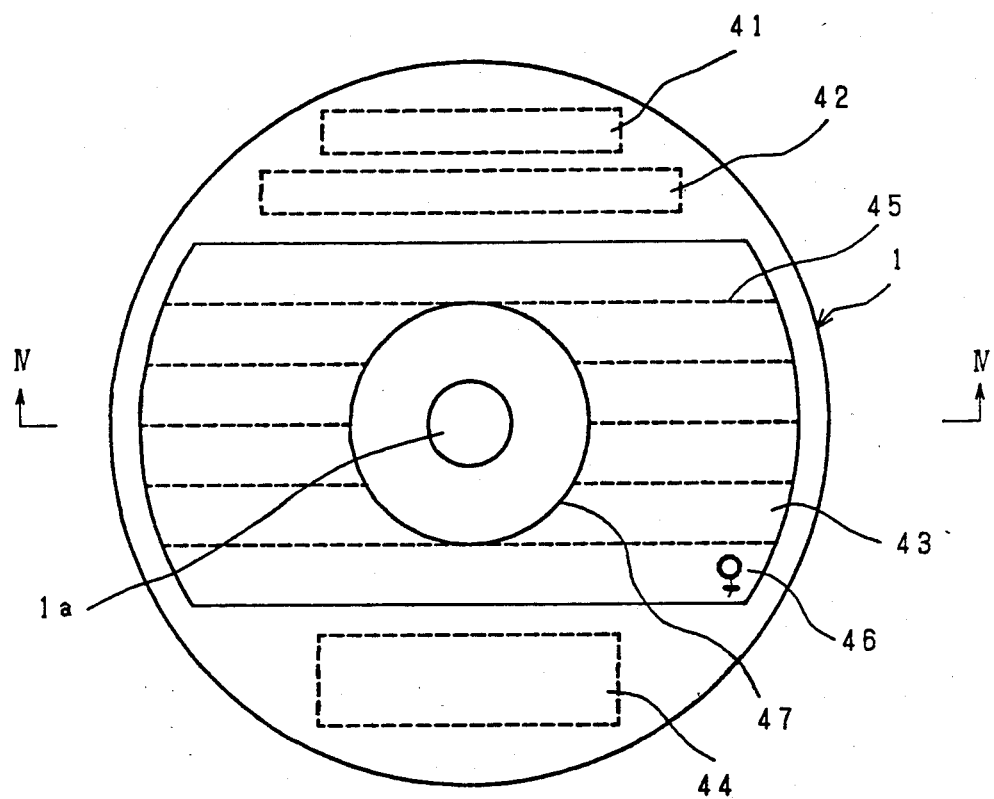
FIG. 3 is a plan view showing the non-playback side of a compact disc representing a second embodiment of the invention.
Figure 4:
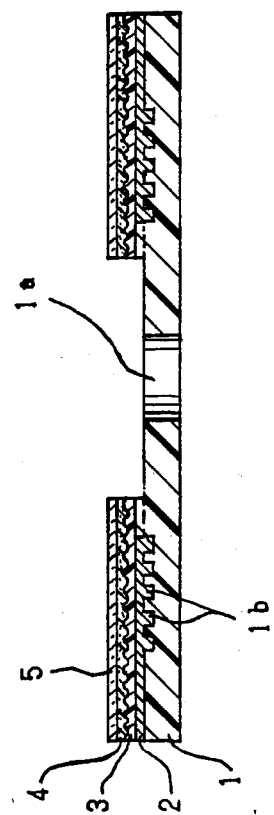
FIG. 4 is a sectional construction view thereof.

FIG. 3 is a plan view of the non-playback side of a second embodiment, and FIG. 4 is a sectional view taken on line IV—IV therein. In the figures, parts corresponding to those of the first embodiment shown in FIGS. 1 and 2 are designated by same reference numerals. In this second embodiment, the write-in region 43 is formed of the protective layer 4 by rough surfacing. The degree of such surfacing is selected so that fine lines may be clearly drawn by aforesaid writing means.

Figure 5:
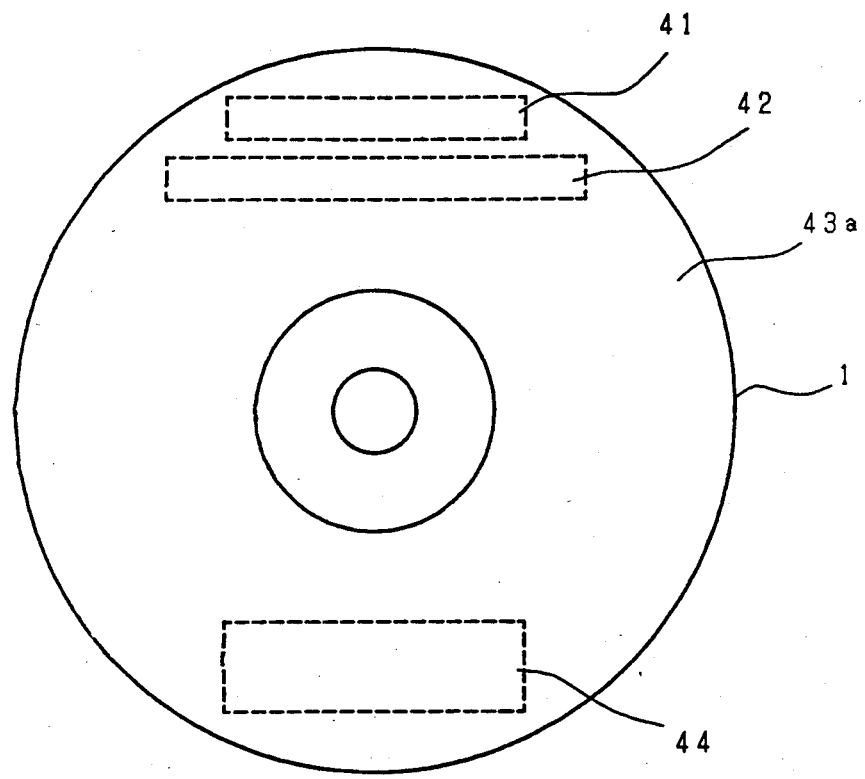
FIG. 5 is a plan view showing a compact disc according to a third embodiment of the invention, prior to the stage of a tack seal being applied thereon.
Figure 6:
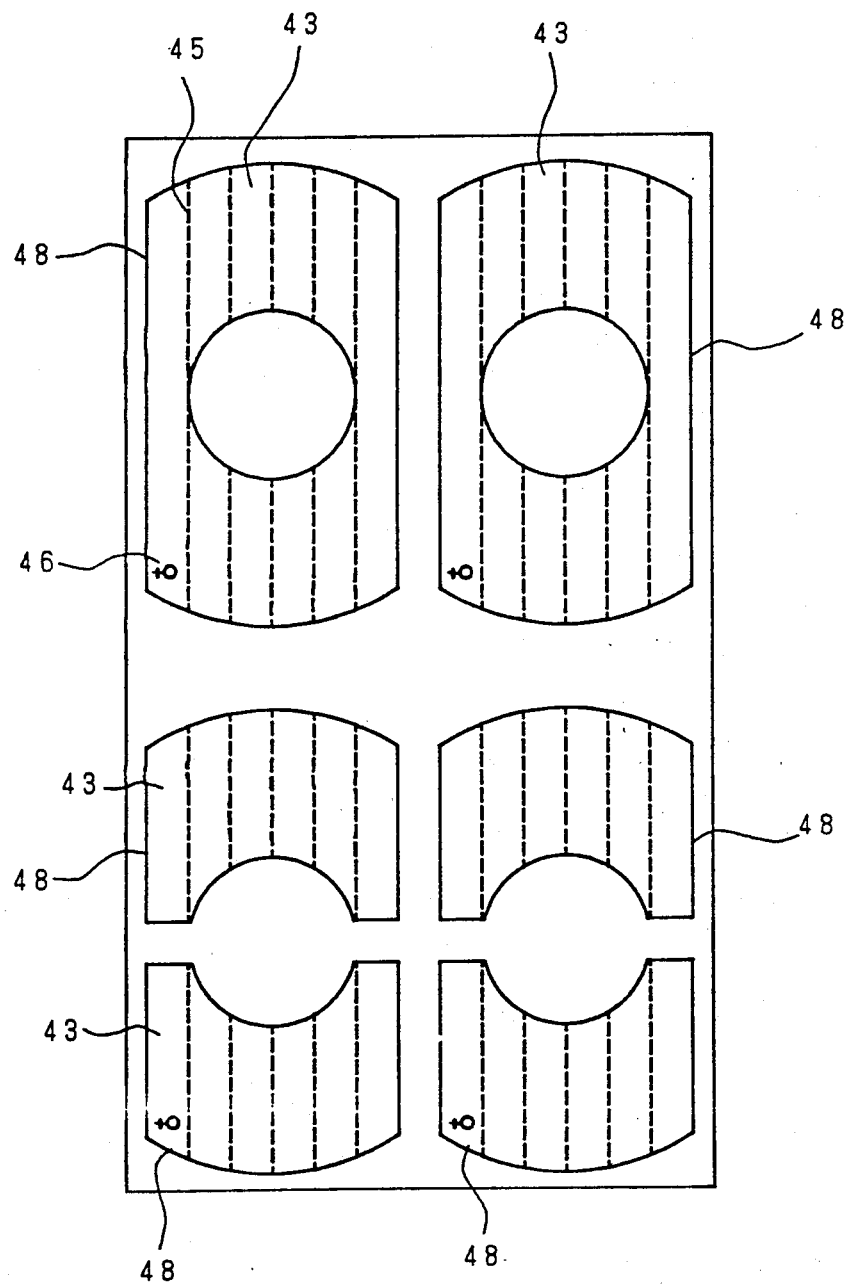
FIG. 6 is a plan view of a tack seal.
Figure 7:
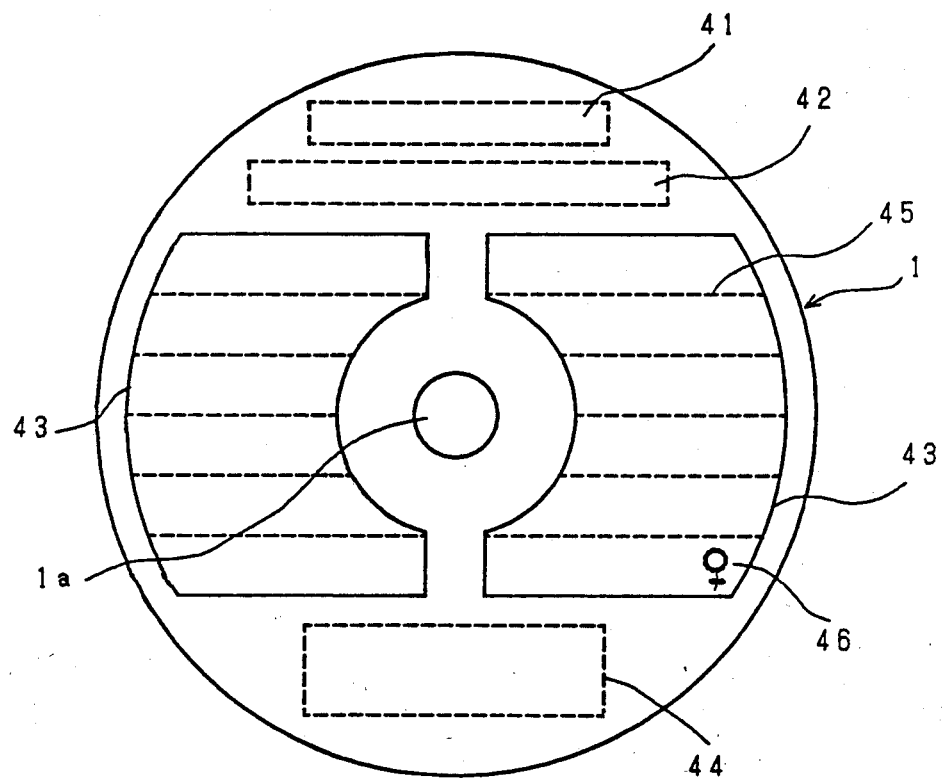
FIG. 7 is a plan view of the third embodiment in its completed condition.

Next, a third embodiment will be explained. In this embodiment, the disc has no such specially finished surface as is different in any way from a conventional disc, and a paper material is adhesively placed on the non-playback side of the disc to provide a write-in region. FIG. 5 shows a disc having a brand region 41, a title region 42, and a music title and artist name region 44, whose regions all have relevant information printed therein, with a blank space 43a left in the center of the disc. A message reading, for example, "Fix the seal in place" may be printed on this blank space. FIG. 6 is a plan view showing a tack seal to be used to provide a message write-in region 43. The tack seal has an adhesive coated on the back, and has ruled lines 45 and a decorative mark 46 printed on its surface. Further, the tack seal has a release paper (not shown) releasable applied to the adhesive coat. Cutting lines 48 configured to the blank space 43a of the disc are provided. The user may write a message in the space defined by the cutting lines and then release that portion off for adhesion to the blank space 43a. FIG. 7 is a plan view showing a compact disc as it appears when a message write-in region 43 is formed by placement of the tack seal. The pattern of cutting may be of such shaped as is reprented by the write-in region 43 shown in the first or second embodiment, or may be such two-parted shape as is shown in FIGS. 6 and 7. In the case where a write-in region is formed of a paper material, such material may be adhesively placed on the protective layer 4 at the manufacturer's factory, instead of using such tack seal as in the third embodiment.

Figure 8:
FIG. 8 is a plan view showing a modification.

FIG. 8 illustrates an actual disc design by way of example.

The invention cannot only suit the purpose of writing a message for gift, but also it can meet the requirements of the user for doing all work by himself in connection with the non-playback side design of the disc. In such case, almost the entirety of the non-playback side may be utilized to provide a message write-in region. For gift purposes, discs of various different prices may have to be prepared, but in order to provide the disc of the invention at an economical price, one idea is to reasonably reduce the length of the recorded music. In this case, the write-in region 43 is larger in area than the playback portion of music information or performance.

Not only is the invention applicable to the standard type compact disc, but also it is applicable to different-format or enlarged discs, such as CD-ROM, CD-I, CD-V, Write once Optical Disc and Erasable Optical Disc. Further, the invention is applicable to laser vision discs which can effectively record not only audio information but also video information as CD-V does. It is also applicable to document file discs which record video information only.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical recording disc including a light transmissible substrate having on one side thereof a recording surface for recording audio, visual and/or literal information, and a protective layer on said recording surface, the recorded information being read out by irradiating a light on a side of said substrate opposite said recording surface, said optical recording disc comprising means defining a write-in-region provided on said protective layer, said write-in-region including a roughened surface for having entered thereon a note or the like by conventional writing means, said write-in region being in overlying relationship to said recording surface.

2. An optical recording disc as set forth in claim 1, wherein said disc is a compact disc.

3. An optical recording disc as set forth in claim 1, wherein said write-in region is larger in area than the area in which the information is recorded.

4. An optical recording disc as set forth in claim 1, wherein said writing means is a ball point pen, a felt pen, or a pencil.

5. An optical recording disc in accordance with claim 1, wherein said write-in-region has a light color.

6. An optical recording disc in accordance with claim 5, wherein said write-in-region is colored white.

7. An optical recording disc including a light transmissible substrate having on one side thereof one of a recording surface and a recording film for recording audio, visual and/or literal information, and a protective layer on said one of said recording surface and recoding film, the recorded information being is read out by irradiating a light on a side of said substrate opposite said one of said recording surface and recording film, said optical recorded disc comprising a write-in-region provided on said protective layer for adding a note or the like by writing means, said write-in region being in overlying relationship to said one of said recording surface and recording film and including a surface having printing ink deposited thereon, and a transparent seal for adhesively covering asid write-in region after adding a note or the like therein.

8. An optical recording disc as set forth in claim 7, wherein said transparent seal is releasable.

9. An optical recording disc as set forth in claim 7, wherein said transparent seal is unreleasable.

10. An optical recording disc including a light transmissible substrate having on one side thereof a recording surface for recording audio, visual and/or literal information, and a protective layer on said recording surface, the recorded information being read out by irradiating a light on a side of said substrate opposite said recording surface, said optical recording disc comprising means defining a write-in-region provided on said protective layer for having entered thereon a note or the like by conventional writing means, said write-in region being in overlying relationship to said recording surface and including a surface having printing ink imparting a roughened surface to the write-in-region deposited thereon, and a title region also provided on said protective layer for a title relevant to said note or the like in the form of letters or a pictorial design.

11. An optical recording disc as set forth in claim 10, wherein said title region has lettering or a pictorial design inscribed therein by printing.

12. An optical recording disc as set forth in claim 10, wherein said title region is available for writing therein by writing means.

13. An optical recording disc as set forth in claim 10, wherein said disc is a compact disc.

14. An optical recording disc as set forth in claim 10, wherein said write-in region is larger in area than the area in which the information is recorded.

15. An optical recording disc as set forth in claim 10, wherein said writing means is a ball point pen, a felt pen, or a pencil.

16. An optical recording disc in accordance with claim 10, wherein said write-in-region has a light color.

17. An optical recording disc in accordance with claim 16, wherein said write-in-region is colored white.

18. An optical recording disc including a light transmissible substrate having on one side thereof one of a recording surface and a recording film for recording audio, visual and/or literal information, and a protective layer on said one of said recording surface and recording film, the recorded information being read out by irradiating a light on a side of said substrate opposite said one of said recording surface and recording film, said optical recording disc comprising a write-in-region provided on said protective layer for adding a note or the like by writing means, said write-in region being in overlying relationship to said one of said recording surface and recording film and including a surface having printing ink deposited thereon, and a title region also provided on said protective layer for a title relevant to said note or the like in the form of letters or a pictorial design, and a transparent seal for adhesively covering said write-in region after adding a note of the like therein.

19. An optical recording disc as set forth in claim 18, wherein said transparent seal is releasable.

20. An optical recording disc as set forth in claim 18, wherein said transparent seal is unreleasable.

* * * * *